: 2,894,906
Patented July 14, 1959

2,894,906
DRILLING FLUID COMPOSITION FOR POROUS FORMATIONS

James E. R. Sheeler, Odessa, Tex., assignor to Shell Development Company, New York, N.Y., a corporation of Delaware No Drawing. Application December 23, 1953
Serial No. 400,140

29 Claims. (Cl. 252—8.5)

This invention pertains to the drilling of oil wells, and relates more particularly to a method and composition for preventing or minimizing the loss of drilling fluid from a well borehole into permeable and porous, fissured or fractured formations.

An essential feature in the rotary drilling of oil wells is the use of a drilling fluid or mud, consisting of a suspension in a suitable liquid, such as water or oil, of material such as clay or calcium carbonate, sometimes weighted down with additional comminuted heavy materials, such as barytes, galena, red lead, crushed oyster shells, etc.

The functions of the drilling fluids are to lubricate the bit, to carry the cuttings up to the surface, to furnish a static head of liquid which over balances formation fluid pressures, and to form on any permeable walls of the borehole a sheath capable of preventing or minimizing the penetration of the drilling fluid into the formation, and its loss therein.

As the drilling fluid is usually circulated in the borehole under a pressure generally exceeding that of the formation fluids, its liquid component, together with the smaller colloidal or solid particles suspended therein, flows into the formation openings such as crevices and fissures or through the interstices, passages, or pores between the grains of the sandstones, permeable limestones, etc. The larger clay or solid particles, however, tend to become arrested between adjacent grains or walls of fine fissures and act as plugs or bridges decreasing the size of the flow passages therebetween, and allowing the smaller clay particles to become in turn arrested and to act as plugs in or on said passages. A drilling mud of good plastering properties quickly forms, in this manner, a substantially liquid-impervious mud sheath on the walls of the borehole.

In many cases, however, the amounts of the drilling fluid lost from the borehole to the formation depend less on the plastering properties of the drilling mud than on the structural characteristics of the strata traversed by the well. Thus, in formations having fissures, cavities, or crevices, and especially in low pressure coarse-grained permeable porous formations, the solid particles ordinarily present in the drilling mud easily pass through the interstices between adjacent grains of sand or gravel without exerting any plugging action, with the result that large volumes of the expensive drilling mud are carried into the formations and lost, causing a loss of circulation of the mud, which may, in turn, lead to the freezing of the drill string, the collapse of the walls of the borehole, or other undesirable consequences.

When such formations are drilled through, an attempt is made to prevent the loss of the drilling mud, and of the circulation thereof, by adding various materials such as cottonseed hulls, mica flakes, sawdust, Celluloid, or cellophane flakes, grown natural rubber or gutta percha, etc., to the mud and circulating the material-laden mud down the borehole until the particles of material plug or bridge in or on the cavities or porous formation and prevent any further loss of drilling mud thereto. However, even the most effective of the materials that have been suggested for use in drilling muds for preventing loss of circulation possess one or more of the following undesirable properties:

(1) The individual particles of any one material possess no tendency to stick together to form a mat that will plug a porous formation, nor do they have any tendency to adhere to the borehole wall or to other plugging materials carried by the drilling mud. Thus, in order to close a porous formation with one of the presently known plugging materials, the material must be held together in the form of a sealing mat solely by the pressure of the drilling fluid acting thereagainst. Many of these materials supply in fact a brush-pile type of mat which, rather than inhibiting loss, act as a filter aid.

(2) The physical characteristics of most of the presently known materials are such that they are unable to withstand any substantial amount of abrasion without being ground into a finely-divided pulp or dust. When a drilling mud is circulated through the drill string, drill bit and borehole, larger particles are commonly subjected to varying amounts of abrasive action converting them into finely comminuted particles which are capable of little plugging or sealing action and are readily washed through the openings of a porous formation.

(3) The physical and chemical properties of many materials are unfavorably affected by oil and/or petroleum products which tend partially or completely to disintegrate said materials. Materials that are thus affected by oil cannot be used effectively in oil base muds, in oil base emulsions, in water-base emulsions, or in any drilling and mud where they may come in contact with oil from the producing zone of the well.

(4) The original size of most particles of materials that have been suggested is so small that inadequate bridging action is furnished by these particles in all but the relatively smallest pores and cavities.

(5) The majority of the present plugging materials can only be added to a driling mud in small concentrations without increasing the viscosity of the mud to such a degree that it can no longer be circulated in the borehole with normal mud pumps.

It is an object of the present invention to provide an improved method for minimizing or preventing the loss of drilling mud to the formation and for correcting the loss of circulation in a well borehole.

Another object of this invention is to provide a barrier to the flow of drilling mud into a permeable and/or fractured zone, which barrier is not harmfully affected or easily destroyed by the normal action of the drill bit and drill string or the normal erosive effect of the drilling fluid stream.

Another object of this invention is to provide a material for drilling muds which meets the requirements of an all-purpose additive to prevent loss of the fluid to surrounding formations.

Another object of this invention is to provide drilling fluid additives for sealing a well borehole which do not interfere with the pumping of the drilling fluid, which do not deteriorate substantially during the drilling operation, and which do not readily separate out of the drilling fluid.

A further object of this invention is to provide a formation plugging material which may be added to a drilling fluid in high concentrations without raising the viscosity of said fluid to such a degree that it can no longer be pumped.

Another object of this invention is to provide a sheath-forming plugging material adapted to be added to drilling fluids to seal porous formations, which material will not chemically affect the drilling fluid and will not be affected by the chemicals contained in said fluid.

Another object of this invention is to provide a method for sealing off coarse-grained permeable porous formations by means of a drilling mud having added thereto a fibrous material carrying suitable bonding agents which cause the fibers to cohere and adhere to the porous formation of a borehole when immersed in drilling fluid.

Other objects and advantages will become apparent from the following description of the invention.

Considerable research and testing has been done, both in the laboratory and in oil well drilling operations, in connection with the development of the present invention, whereby lost circulation of drilling fluid into the porous formations of a well borehole is corrected by admixing with the drilling fluid quantities of natural or synthetic fibers carrying pieces of natural or synthetic rubber or a rubber-like material which either adheres to or is interwoven with said fibers. The resultant mixture of drilling fluid and rubberized fibers is pumped through the well bore to contact the lost circulation zone thereof, where the rubberized fibers form a filter cake of self-bonding particles, the rubber on the fibers acting to bond the fibers together in a matting structure to form a fluid impervious barrier to the passage of drilling fluid from the borehole into the surrounding formations.

Variuos types of fibers may be used, such as fibers of cotton, wool, rayon, nylon, acetate, or any other fiber having adequate strength with a high degree of flexibility. Either animal, vegetable or synthetic fibers may be used according to the present invention to provide the necessary matting structure to plug the porous formation of the borehole. The length of the fibers may vary anywhere from about 1/4 of an inch in length to 3 inches or more in length, the maximum length being limited by the type of mud pump employed at the well to circulate the drilling fluid and the size of the orifices in the drilling bit. In general, fibers shorter than 1/4 inch fail to form an effective sealing mat on a porous formation.

The term rubberized fabric or rubberized fibers, as employed herein, is employed to describe any of the above-named fibers having particles of rubber adhering to their surface or thread-like lengths of rubber interwoven therewith. In some instances, a single fiber may only have a few rubber particles adhering thereto about the size of a finely-ground powder. At other times, a fiber may be covered substantially with rubber particles of the same size. In other instances, the fibers may have rubber threads wound therearound in the manner in which certain latex or rubberized yarns are made. Additionally, several of the fibers may be interwoven with several threads of rubber to form small pieces of a rubberized fabric. Also, individual fibers or groups of fibers may be sprayed with latex rubber so that a substantially continuous coating is formed on the fiber or groups thereof. Still, at other times, one or more cords or fibers may be imbedded in or extend through small pieces of rubber of regular or irregular shape having a maximum dimension of about 3/4 of an inch.

Rubberized fibers, as employed in accordance with this invention, are relatively inexpensive and may be obtained from various sources, such scrap as from mills manufacturing latex yarns, the discarded ends and pieces from factories manufacturing rubberized cloth or from garment manufacturers using the same, or from old automobile tires or other rubber fabric goods which have been ground up or shredded. Additionally, rubberized fibers for use in drilling muds can be manufactured by partially or substantially completely coating any desired type of fiber with latex rubber. The fibers should be agitated when they are coated so that they do not stick together in a single mass.

A particularly advantageous way of obtaining rubberized cotton, rayon and nylon fibers and/or mixtures thereof consists in shredding automobile tires which yields a mass formed of a mixture of about 1/3 by volume rubber fragments and about 2/3 pieces of tire cord having rubber particles adhering thereto. By weight, this volume is reversed, being approximately 1/3 by weight of cord fragments and 2/3 rubber fragments. Examination of filter mats deposited on gravel under elevated pressures shows a range of sizes from complete cords to the individual fibers themselves, indicating a wide range of fiber sizes. The rubber fragments vary in size from 1/4 inch up to angular flat fragments of a maximum size approximately 5/8 by 3/8 by 3/16 inches. The bulky rubber fragments, which constitute 2/3 of the weight of the shredded automobile tires, can be readily separated from the mass in any suitable manner to leave a rubberized cord-fraction material for use in accordance with the present invention. However, at times where a bulky loss circulation additive is desired for addition to a drilling fluid, the entire shredded tire material containing both the rubberized cord fragments and the rubber fragments may be added. The rubber fragments, when employed alone, do not appear to be especially effective without the presence of rubberized fibers which are adapted to cohere together and form a mat, which, in turn, closes the interstices between the rubber fragments.

In practicing the present invention, whenever it is desired to regain lost circulation, or to prevent loss of circulation when drilling a well through a permeable formation layer, or fracture zone, there is added to the usual drilling mud of normal colloidal properties a suitable quantity of rubberized cords or fibers, such as from 0.5 to 15 percent by weight. A drilling mud comprising the above sealing material quickly forms a substantially fluid-impervious sheath on the walls of the borehole, the individual fibers cohering in a mass to close the interstices between the coarse sand grains and, at the same time, exerting what may be described as a gasket-action between the hard irregular-shaped sand grains to stop the flow of fluid into the formation.

The particular effectiveness of most presently known filler materials is, in general, related to the average pore size of the permeable formation. While most filler or plugging materials are effective in closing coarse-grained porous formations, they are readily lost in formations where the pores are much larger.

The effectiveness of the present rubberized fibers as sealing materials for porous formations having large openings has been adequately proven by actual tests. In the laboratory, a filtration cell was employed using a very coarse gravel bed selected to simulate the actual openings that are present in cases of serious loss of circulation. Instead of using pea gravel, which is often used in filtration cells, a very coarse gravel was packed into the cell with the individual pieces of gravel ranging from 3/4 to 1 3/4 inches in length and diameter. Care was exercised to reproduce the same pattern for each test, with the largest rocks and openings being located at the top of the cell and diminishing in size toward a perforated plate on the bottom of the cell. If any of the material tested formed a mat against the bottom-perforated retaining plate, it was considered to have flushed through the cell.

A standard mud was prepared of bentonite and low-yield clay weighing 8.9 lbs per gallon (67 lbs. per cubic foot) and having a Marsh funnel viscosity of 74 seconds. Other properties of the drilling mud were as follows: initial gel strength—45 grams, 10 minute gel strength—67 grams, Stormer viscosity—40 cp., and water loss—10.4 cc. The amounts of rubberized fibers and other lost circulation materials were measured on a dry basis and stirred into individual mud samples. Each sample was tested by pouring it into the top of the filtration cell and the air pressure was applied to the top of the cell up to a maximum of 1600 p.s.i. to test the strength of the seal formed within the cell by the lost circulation material.

In comparing the present rubberized fibers obtained from shredded automobile tires with a proprietary mixture of textile fibers and sawdust, the mat formed within the cell by the rubberized fibers still held when the maximum pressure, 1600 lbs., had been applied, whereas the sealing mat formed by the mixture of textile fibers and sawdust blew out at 1400 lbs. per square inch. This test was carried on with an amount of sealing material present equal to 20 lbs. of sealing material per barrel of mud. A second test was carried out using twice as much rubberized fiber (that is, equal to 40 lbs. of fiber per barrel of mud) with the same results, that is, the mat held at the maximum pressure of 1600 lbs. p.s.i. A 40 lb. per barrel mixture of the textile fibers and sawdust could not be tested because of its extreme viscosity.

It was also impossible to test the same proportions of a mixture of 2 parts bagasse, 1 part wood fiber, and 2 parts cellophane flakes in the standard drilling mud because of is extreme viscosity. Thus, it may be seen that the present rubberized fibers may be aded in high concentrations to drilling muds without the muds becoming too viscous to pump. Many drilling muds will tolerate 40 to 50 lbs. or more per barrel of mud of rubberized fibers or shredded tire material and still retain a pumpable viscosity, and are readily displaced through the drill bit. It was noted that while the viscosity of muds containing rubberized fibers increased to some extent, the gel strengths of the muds increased very little.

In another test a mud containing 15 lbs. per barrel of cellophane flakes formed a mat which held together up to a pressure of only 800 p.s.i. In a like manner, a similar mud containing 20 lbs. per barrel of textile fibers formed a mat which could only withstand pressures up to 800 p.s.i. Muds with greater concentrations of these plugging materials were too viscous to pump. As compared with these muds, similar muds containing 20 and 40 lbs. per barrel of the present rubberized fibers withstood pressures of 1600 p.s.i.

A further test showed the superiority of the present combination of rubberized fibers and rubber particles when used as a plugging agent in a mud as compared with a similar mud containing chopped rubber fragments of the same size without any fibers present. The mat formed by the rubberized fiber and particle combination of the present invention withstood 1600 p.s.i. whereas the mat formed by the rubber fragments alone failed to withstand 300 p.s.i.

To date, the rubberized fibers of the present invention have been tested to combat lost circulation occurrence in wells in Louisiana, Texas, Oklahoma and California. At some wells, the plugging materials were admixed more or less continuously in the driling mud as it was pumped into the well, while at other wells, a large amount or "slug" of the plugging material mixed with mud was introduced into the well at one time.

In a certain Okahoma deep-test well, three separate applications of the present sealing material were made with complete success. The losses were believed to have been into cavernous-type formations. Shredded tire material was used in ten separate applications in five different wells located in Louisiana. Mud slugs ranging in size from 55 to 180 barrels and containing from 7 to 30 lbs. per barrel of shredded tire material were used with the slugs pumped through the drill pipe and spotted opposite the suspected zones of loss. In another application, the lost circulation material was admixed with the mud homogeneously as it was pumped into the well. After the mud slugs has been spotted, the well was allowed to stand for a waiting period which varied from 3 to 12 hours. Total depths of the wells at the time circulation was lost ranged from 4608 feet to 11,784 feet and, in all cases but two, the total depths exceeded 10,000 feet. The types of mud employed at the times of lost circulation included red muds, lime-treated muds, and lime-treated oil emulsion muds with the mud densities ranging from 9.5 lbs. per gallon (71 lbs. per cubic foot) to 17.0 lbs. per gallon (127.5 lbs. per cubic foot). The present plugging material also finds excellent use in water base muds, oil base muds, oil-in-water or water-in-oil emulsions, high or low pH muds, and salt water base muds.

In five of the applications, the shredded tire material was completely successful in restoring circulation. In three cases, moderate success was obtained and in the other two cases, the results were obscured inasmuch as the muds contained large quantities of other lost circulation additives.

Rubberized fibers according to the present invention may be added to the mud through a mud-hopper or dumped directly into the mud-pits. It has been found that if the mud density is high, shredded tire material mixes better when it is added through a mud-hopper at a very slow rate. The cord fibers in this material absorb small amounts of water; therefore, if the solids content of the mud is high, some water should be added along with the tire material to keep the viscosity from rising excessively.

While it is known that a normal drilling mud can be lost to coarsely-permeable formations, it is believed that the important lost circulation zones contain faults, or fissures (either opened or induced) or cavities and channels. In many fields, the presence of much faulting has been factually established and the seal on such faults is gravitational, the weight of the overburden on the shale-on-shale faces. Apparently, the hydrostatic pressure of the drilling fluid in a well borehole plus the pressures of the mud pump can open or disturb such seals and mud is lost to the resulting open fissure. In some cases, with the mud pump shut down, the level of drilling fluid in the well is frequently at or near the surface. While the plugging of great caverns in the formation may be impossible, it is possible to displace large amounts of the present plugging material through the caverns to plug or bridge connecting channels in the same manner that fissures are plugged.

The present rubberized fiber plugging material is not subject to fermentation and is not affected during placement by high temperatures, highly alkaline muds or salt muds. However, after placement into the well borehole, the rubber particles or threads carried by the present plugging material tend to soften and become sticky when exposed to the high temperatures and pressures of wells, thus, causing the rubber particles on the fibers to bond the fibers together to form an effective seal against lost circulation. In a like manner, when used in an oil base mud or emulsion, the rubber particles swell and partly dissolve in the oil, thus forming a glutinous mass especially effective for sealing purposes.

The sealing action of the present material is important from two aspects. The first is from the standpoint of bridging the interstices between coarse-grain granular formations. Due to the wide particle-size range and combination of flexible fibers and stiffer rubber particles, the shredded tire material is capable of a bridging action within formation openings which the commercial lost circulation materials now in use largely lack. This is proved by the results of the tests on the coarse gravel filtration beds shown above. The second consideration is a gasketing action of the rubberized fibers with or without additional rubber particles when induced fissures tend to close. Faster gasketing action is experienced when the present rubberized fibers are used in oil-containing drilling fluids.

If it is undesirable to wait sufficiently long to allow the well temperature and pressure to increase the adhesiveness of the rubberized fibers to improve their gasketing property, this property can be improved more rapidly at the surface by admixing oil with the rubberized fibers or shredded tire material to swell the rubber, increase its elasticity, and make it glutinous. Any type of oil may be used, but an oil with a low aniline number or high aromatic content will give the fastest results. Also, the oil-soaked rubberized fibers may be heated at the surface to speed up the reaction. The attack of the oil on the rubberized material is slow enough so that the mixture of oil and shredded material can be safely displaced through the pumps and drill pipe into the porous formation of the borehole before any major action of the oil takes place to cause the rubberized fibers to cohere into one mass. The improved gasket action derived from the resulting tenaciousness of the rubber particles on the fibers is considered to be of the most importance. Additionally, the present material may be first placed in the porous formation of the borehole and later a slug of oil may be circulated down through the drill pipe and spotted adjacent the porous formation so as to make the seal of rubberized fibers more glutinous.

Neither oil-base muds, water-base muds, nor oil and water emulsions are adversely affected chemically by the present rubberized fiber material, nor is this material adversely affected chemically by any of the muds. Neither the rubberized fibers nor a combination of the rubberized fibers and rubber particles, as found in shredded tires, deteriorates appreciably due to the action of pumps, guns, bits, etc. The plastering material may be stored, handled, mixed with ease and convenience and economy.

Tests show that the presence of shredded tires in a mud does not interfere with sample logging. The cord material in the tires sometimes yields a light blue fluorescence, but does not give any ether-cut, and of course, the source of the fluorescence is evident. The rubber fragments have no fluorescence, but when cut with ether have an initial light blue fluorescence which, on drying out, changes to yellow. Thus, confusion with showings of crude oil can hardly occur. Generally, crude oil when examined under fluorescent light has a blue fluorescence whether the sample is oil globules in mud or as oil dissolved in ether, or as the residue when ether is evaporated.

I claim as my invention:

1. In the drilling of oil wells, the method of overcoming loss of circulation comprising the steps of adding small pieces of rubberized fiber to the drilling fluid, circulating the resultant composition in the well in contact with the face of a porous formation and causing said composition to form a substantially fluid-impervious sheath on the face of said formation.

2. The method of preventing drilling fluid loss in well boreholes which comprises introducing into the borehole a quantity of fibers having particles of rubber adhering thereto, and circulating said fibers down the well to a lost circulation zone therein.

3. The method of preventing drilling fluid loss in well boreholes which comprises introducing into the borehole a quantity of fibers having particles of rubber adhering thereto, said fibers being of lengths of the order of approximately ¼ to 4 inches, and circulating said fibers down the well to a lost circulation zone therein.

4. A process for correcting lost circulation of drilling fluid during drilling of a well, comprising admixing with said drilling fluid rubberized fibers in an amount between about 2 and 50 lbs. per barrel of drilling fluid and pumping the resulting mixture through said well borehole to contact the lost circulation zone in said borehole.

5. The process for correcting lost circulation of drilling fluid during drilling of a well, comprising admixing with said drilling fluid rubberized fibers in an amount between about 2 and 50 lbs. per barrel of drilling fluid, and pumping the resultant mixture into the well borehole to contact the lost circulation zone in said borehole, and circulating a quantity of oil through said borehole to contact the rubberized fibers at said lost circulation zone.

6. A process for correcting lost circulation of drilling fluid during drilling of a well, comprising admixing with said drilling fluid a mixture of rubberized fibers and a filler of small fragments of rubber ranging in size up to a maximum dimension of ¾ of an inch in an amount of between about 2 and 50 lbs. per barrel of drilling fluid, and pumping the resulting mixture through said well borehole to contact the lost circulation zone within said borehole.

7. A process for correcting lost circulation of drilling fluid during drilling of a well, said process comprising contacting a quantity of rubberized fibers with an oil, admixing said oil-treated rubberized fibers in said drilling fluid in an amount between 2 and 50 lbs. per barrel of drilling fluid, and pumping the resulting mixture through said well borehole to contact the lost circulation zone in said borehole.

8. A process for correcting lost circulation of drilling fluid during drilling of a well, comprising admixing with said drilling fluid rubberized fibers in an amount between about 2 and 50 pounds per barrel of drilling fluid, said rubberized fibers being shredded latex yarn scrap, and pumping the resulting mixture through said well borehole to contact the lost circulation zone in said borehole.

9. A process for correcting lost circulation of drilling fluid during drilling of a well, comprising admixing with said drilling fluid rubberized fibers in an amount between about 2 and 50 pounds per barrel of drilling fluid, said rubberized fibers being shredded rubberized cloth, and pumping the resulting mixture through said well borehole to contact the lost circulation zone in said borehole.

10. A process for correcting lost circulation of drilling fluid during drilling of a well, comprising admixing with said drilling fluid rubberized fibers in an amount between about 2 and 50 pounds per barrel of drilling fluid, said rubberized fibers being shredded automobile tires, and pumping the resulting mixture through said well borehole to contact the lost circulation zone in said borehole.

11. A process for correcting lost circulation of drilling fluid during drilling of a well, comprising admixing with said drilling fluid rubberized fibers in an amount between about 2 and 50 pounds per barrel of drilling fluid, said rubberized fibers being shredded rubber-coated fibers, and pumping the resulting mixture through said well borehole to contact the lost circulation zone in said borehole.

12. A process for correcting lost circulation of drilling fluid during drilling of a well, comprising admixture with with said drilling fluid rubberized fibers in an amount between about 2 and 50 pounds per barrel of drilling fluid, said fibers carrying rubber in an amount sufficient to cause said fibers to mat together under well conditions of use, and pumping the resulting mixture through said well borehole to contact the face of the lost circulation zone in said borehole.

13. A process for correcting lost circulation of drilling fluid during drilling of a well, comprising admixing with said drilling fluid rubberized fibers in an amount between about 2 and 50 pounds per barrel of drilling fluid, said fibers carrying rubber in an amount sufficient to cause said fibers to mat together under well conditions of use, said fibers being selected from the group consisting of nylon, rayon, cellulose acetate, cotton, wool, and mixtures thereof, and pumping the resulting mixture through said well borehole to contact the face of the lost circulation zone in said borehole.

14. A process for correcting lost circulation of drilling fluid during drilling of a well, comprising admixing with said drilling fluid a mixture of rubberized fibers and a filler of small fragments of rubber in an amount of between about 2 and about 50 pounds per barrel of drilling fluid, said fibers carrying rubber in an amount sufficient to cause said fibers to mat together under well conditions of use, and pumping the resulting mixture through said well borehole to contact the face of the lost circulation zone within said borehole.

15. A process for correcting lost circulation of drilling fluid during drilling of a well, comprising admixing with said drilling fluid a mixture of rubberized fibers and small fragments of rubber in an amount of between about 2 and 50 pounds per barrel of drilling fluid, said fibers carrying rubber in an amount sufficient to cause said fibers to mat together under well conditions of use, said fibers being selected from the group consisting of nylon, rayon, cellulose acetate, cotton, wool and mixtures thereof, and pumping the resulting mixture through said well borehole to contact the face of the lost circulation zone in said borehole.

16. A process for correcting lost circulation of drilling fluid during drilling of a well, comprising admixing with said drilling fluid a mixture of rubberized fibers and a filler of small fragments of rubber in an amount between about 2 and 50 pounds per barrel of drilling fluid, said mixture of rubberized fibers and rubber fragments being formed of shredded automobile tires, and pumping the resulting mixture through said well borehole to contact the face of the lost circulation zone in said borehole.

17. A process for correcting lost circulation of drilling fluid during drilling of a well, comprising admixing with said drilling fluid rubberized fibers in an amount between about 2 and 50 pounds per barrel of drilling fluid, said rubberized fibers being formed of shredded automobile tires, said fibers being selected from the group consisting of nylon, rayon, cellulose acetate, cotton and mixtures thereof, and pumping the resulting mixture through said well borehole to contact the face of the lost circulation zone in said borehole.

18. A process for correcting lost circulation of drilling fluid during drilling of a well, comprising admixing with said drilling fluid rubberized fibers in an amount between about 2 and 50 pounds per barrel of drilling fluid, said rubberized fibers being shredded rubber-coated fibers selected from the group consisting of nylon, rayon, cellulose acetate, cotton, wool, and mixtures thereof, and pumping the resulting mixture through said well borehole to contact the face of the lost circulation zone in said borehole.

19. A process for correcting lost circulation during drilling of a well, comprising admixing with said drilling fluid a mixture of rubberized fibers and small fragments of rubber in an amount between about 2 and 50 pounds per barrel of drilling fluid, said rubberized fibers being shredded substantially rubber-coated fibers carrying rubber in an amount sufficient to cause said fibers to mat together under well conditions of use, and pumping the resulting mixture through said well borehole to contact the face of the lost circulation zone in said borehole.

20. A process for correcting lost circulation during drilling of a well comprising admixing with said drilling fluid rubberized fibers in an amount between about 2 and 50 pounds per barrel of drilling fluid, said rubberized fibers being shredded rubber-coated fibers carrying rubber in an amount sufficient to cause said fibers to mat together under well conditions of use, said fibers being selected from the group consisting of nylon, rayon, cellulose acetate, cotton, wool and mixtures thereof, and pumping the resulting mixture through said well borehole to contact the face of the lost circulation zone in said borehole.

21. A method of restraining fluid against escape from a well bore through the walls thereof comprising introducing into said fluid for circulation in said well bore particles of shredded vehicle tires, said particles comprising rubber and fiber bonded together.

22. A drilling fluid composition for forming a mud sheath on the face of a permeable formation traversed by a well, comprising a drilling fluid containing a clay-containing material suspended therein and also from 0.5% to 15% by weight of small pieces of rubberized fibers, said fibers carrying rubber in an amount sufficient to cause said fibers to mat together under use.

23. The composition according to claim 22 wherein the small pieces of rubberized fibers comprise particles of shredded vehicle tires in which particles the rubber and the fiber are bonded together.

24. A drilling fluid composition for forming a mud sheath on the face of a permeable formation traversed by a well, comprising a drilling mud containing a finely-divided suspended solid material and from 0.5 to 15% by weight of small pieces of rubberized fibers, said drilling mud containing said finely-divided suspended solid material being capable of being circulated in the well during drilling thereof and said fibers carrying rubber in an amount sufficient to cause said fibers to mat together under well conditions of use.

25. A drilling fluid composition for forming a mud sheath on the face of a permeable formation traversed by a well, comprising a drilling mud containing a finely-divided suspended solid material and from 0.5 to 15% by weight of small pieces of rubberized fibers, said drilling mud containing said suspended finely-divided solid material being capable of being circulated in the well during drilling thereof and said fibers being shredded latex yarn scrap.

26. A drilling fluid composition for forming a mud sheath on the face of a permeable formation traversed by a well, comprising a drilling mud containing a finely-divided suspended solid material and from 0.5 to 15% by weight of small pieces of rubberized fibers, said drilling mud containing said suspended finely-divided solid material being capable of being circulated in the well during drilling thereof and said fibers being shredded rubberized cloth.

27. A drilling fluid composition for forming a mud sheath on the face of a permeable formation traversed by a well, comprising a drilling mud containing a finely-divided suspended solid material and from 0.5 to 15% by weight of small pieces of rubberized fibers, said drilling mud containing said suspended finely divided solid material being capable of being circulated in the well during drilling thereof and said fibers being shredded automobile tires.

28. A drilling fluid composition for forming a mud sheath on the face of a permeable formation traversed by a well, comprising a drilling mud containing a finely-divided suspended solid material and from 0.5 to 15% by weight of small pieces of shredded rubber-coated fibers, said drilling mud containing said suspended finely-divided solid material being capable of being circulated in the well during drilling thereof.

29. A drilling fluid composition for forming a mud sheath on the face of a permeable formation traversed by a well, comprising a drilling mud containing a finely-divided suspended solid material and from 0.5 to 15% by weight of small pieces of rubber-coated fibers, said drilling mud containing said suspended finely-divided solid material being capable of being circulated in the well during drilling thereof and said fibers being selected from the group consisting of nylon, rayon, cellulose acetate, cotton, wool and mixtures thereof.

References Cited in the file of this patent

UNITED STATES PATENTS

| | | |
|---|---|---|
| 1,826,091 | Pratt | Oct. 6, 1931 |
| 2,119,829 | Parsons | June 7, 1938 |
| 2,214,366 | Freeland et al. | Sept. 10, 1940 |
| 2,342,588 | Larkin | Feb. 22, 1944 |
| 2,599,745 | Campbell et al. | June 10, 1952 |
| 2,623,914 | Bell et al. | Dec. 30, 1952 |
| 2,650,195 | Cardwell et al. | Aug. 25, 1953 |

OTHER REFERENCES

Bowie: Hardening of Mud Sheaths, Bureau of Mines Report of Investigations No. 3354, pp. 5, 6, 8, 9, 15, 17, 18, and 21 to 24, November 1937.

Rogers: Composition and Properties of Oil Well Drilling Fluids, Revised Ed., pub. 1953 by Gulf Pub. Co. of Houston, Texas, pp. 562 to 564.